United States Patent
Borisov

(10) Patent No.: US 8,797,426 B2
(45) Date of Patent: Aug. 5, 2014

(54) METHOD OF IMAGE NOISE REDUCTION

(75) Inventor: Aleksey Anatol'evich Borisov, Sankt-Petersburg (RU)

(73) Assignee: Zakrytoe akcionernoe obshchestvo "Impul's", Sankt-Petersburg (RU)

( * ) Notice: Subject to any disclaimer, the term of this patent is extended or adjusted under 35 U.S.C. 154(b) by 30 days.

(21) Appl. No.: 13/596,171

(22) Filed: Aug. 28, 2012

(65) Prior Publication Data

US 2013/0057733 A1   Mar. 7, 2013

(30) Foreign Application Priority Data

Sep. 1, 2011  (EA) .................................. 201101158

(51) Int. Cl.
 *H04N 5/217* (2011.01)
(52) U.S. Cl.
 USPC ....................................... 348/241; 348/222.1
(58) Field of Classification Search
 CPC . H04N 5/217; H04N 5/2173; H04N 5/23229; H04N 5/23232; H04N 5/2355
 USPC .............................................. 348/241, 222.1
 See application file for complete search history.

(56) References Cited

U.S. PATENT DOCUMENTS

| | | | | |
|---|---|---|---|---|
| 6,037,986 A | * | 3/2000 | Zhang et al. | 375/240.12 |
| 6,058,143 A | * | 5/2000 | Golin | 375/240.16 |
| 7,720,150 B2 | | 5/2010 | Lee et al. | |
| 2002/0158971 A1 | | 10/2002 | Daiku | |
| 2003/0103568 A1 | | 6/2003 | Lee | |
| 2008/0253456 A1 | | 10/2008 | Yin | |
| 2009/0154825 A1 | | 6/2009 | Yang | |
| 2011/0228167 A1 | * | 9/2011 | Sasaki | 348/607 |
| 2012/0114041 A1 | * | 5/2012 | Sakamoto | 375/240.16 |

FOREIGN PATENT DOCUMENTS

| | | |
|---|---|---|
| EP | 0289152 B1 | 8/1993 |
| RU | 2251820 C2 | 5/2005 |

* cited by examiner

*Primary Examiner* — Tuan Ho
*Assistant Examiner* — Zhenzhen Wu
(74) *Attorney, Agent, or Firm* — Patentbar International, P.C.

(57) ABSTRACT

A method of noise reduction in an image obtained with the use of TV camera comprising a generation of a frame video flow out of frame groups, having timing interdependency; a generation of an image out of output frame series obtained by means of processing of the said frame groups by the use of averaging closely adjacent pixel values in at least one group of frames; and the use of average values considering weight coefficients to form an output frame.

6 Claims, 2 Drawing Sheets

METHOD OF IMAGE NOISE REDUCTION

RELATED APPLICATIONS

This application claims priority to Eurasian Patent Application No. EA201101158, filed Sep. 1, 2011, which is incorporated herein by reference in its entirety.

FIELD OF THE INVENTION

The present method refers to digital image processing namely, to systems processing images obtained with the use of TV camera and intended for image noise reduction.

BACKGROUND OF THE INVENTION

Quality of images obtained with the use of TV camera can deteriorate due to noise. This noise is required to be reduced what will result in image quality improving.

The method of noise reduction in an image obtained with the use of TV camera is known from the patent US2009154825, published on 18 Jun. 2009, comprising a generation of an output frame out of the frame video flow, having timing interdependency; averaging closely adjacent values of frame elements in one group of frames; and the use of average values considering weight coefficients to form an output frame.

The method of noise reduction in an image is known from the patent EP 0289152, comprising a generation of an image out of the frame video flow. Each video frame is formed from the frame video flow by the following way. A comparison of each frame under processing including appropriate elements of previous frames is performed. The comparison results in defining relations used, considering weight coefficients, to form averaged elements of output frames.

SUMMARY OF THE INVENTION

The present invention resulted in noise reduction in an image obtained with the use of TV camera.

The technical result in the method of noise reduction in an image obtained with the use of TV camera comprising in a video channel a generation of a video flow consisting of groups of frames, having timing interdependency; generation video image from a sequence of output frames obtained by processing the said frame groups by averaging closely adjacent values of appropriate pixels at least in one group of pixels; and the use of averaged values considering weight coefficients to form an output frame is achieved by processing groups of frames comprising odd number, that is 2N+1, where N >1 frames being time-symmetrically juxtaposed against frame under processing with the numbers from −N to N inclusive, where 0 is the number of the frame under processing, in which the noise is being reduced, 1 is the number of the following frame, −N is the number of the oldest frame and N is the number of the newest frame; by defining values of frame pixels time-symmetrically juxtaposed against the frame under processing, and their average values; by calculating the absolute value of the said difference with the pixel value of the frame under processing, as a pixel value of the frame under processing are selected considering weight coefficients such pixel values that correspond to the minimal absolute value of the difference.

The method of noise reduction in an image obtained with the use of TV camera comprising a generation of a frame video flow out of frame groups, having timing interdependency; a generation of an image out of output frame series obtained by means of processing of the said frame groups by the use of averaging closely adjacent pixel values in at least one group of frames; and the use of average values considering weight coefficients to form an output frame.

For noise reduction the frames are used that time-symmetrically juxtaposed against the frame under processing forth and back in time. It is understood that for calculation of averaged value of any pixel either appropriate pixel values of one frame or other one, or an averaged pixel value of both these frames is used. To select one out of three values the absolute values of the differences of these values with the pixel value of the frame under processing are calculated, then the minimal absolute value of the difference is defined and appropriate pixel value is used for averaging. While averaging selected pixel values are multiplied by coefficients that depend on remoteness extent from the frame under processing. The amount of frames employed in the method and functional coefficient dependence on remoteness extent from the frame under processing define parameters for noise reduction.

The method provides noise reduction in an image obtained with the use of TV camera.

DESCRIPTION OF THE PREFERRED EMBODIMENTS

Since noise in a channel can cause errors in an absolute value of the difference calculation and therefore, incorrect operation of the noise reducer so the differences are calculated over three in one row adjacent pixels for a noisy video channel. For that purpose an absolute value of the difference for the frame under processing and two adjacent pixels are calculated then, a value for further processing by means of a median filter is selected.

The claimed method is realized in software as media data provided with a guide to execute the said method.

Figure 1:
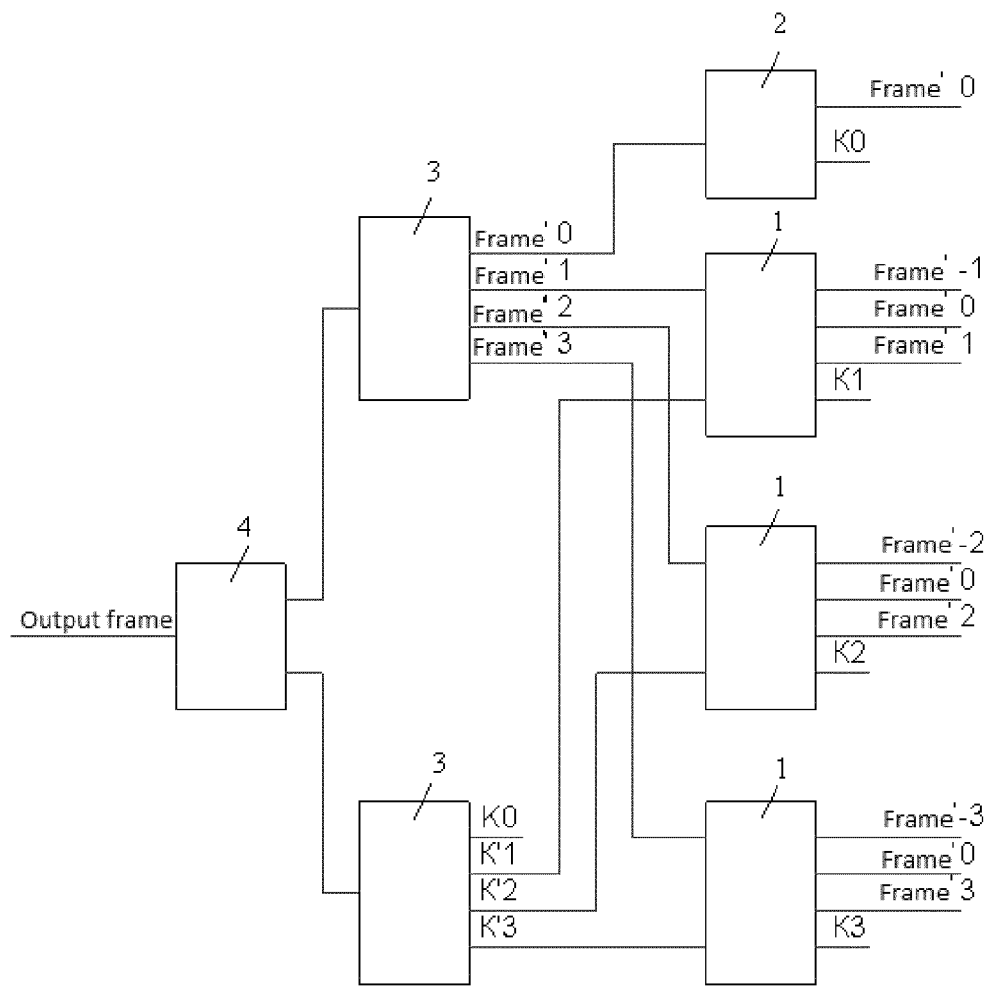
FIG. 1 shows a processing block diagram.

FIG. 1 shows a processing block diagram for N=3, where: 1 is a group processing module, 2 is a multiplier, 3 is an adder, 4 is a dividing unit.

Frame pixels −3÷3 are divided into three groups each of which incorporates a frame under processing and two time-symmetrically juxtaposed against it. Video—flows from every group are transferred to the module 1 (group processing modules). To every module are also transferred weight coefficients K1-K3 correspondingly. Besides, pixels of the frame under processing and coefficient K0 are transferred to the multiplier 2. From the outputs of the module 1 pixel and coefficients values which are used to calculate the said pixel values are transferred to the adders 3. Pixel values are transferred to one adder and, those of coefficients to another one. From the outputs of adders 3 total pixel value and total coefficient value are transferred to the dividing unit 4. Resulting value of noise reduction is read from the output of the dividing unit divisor 4.

Figure 2:
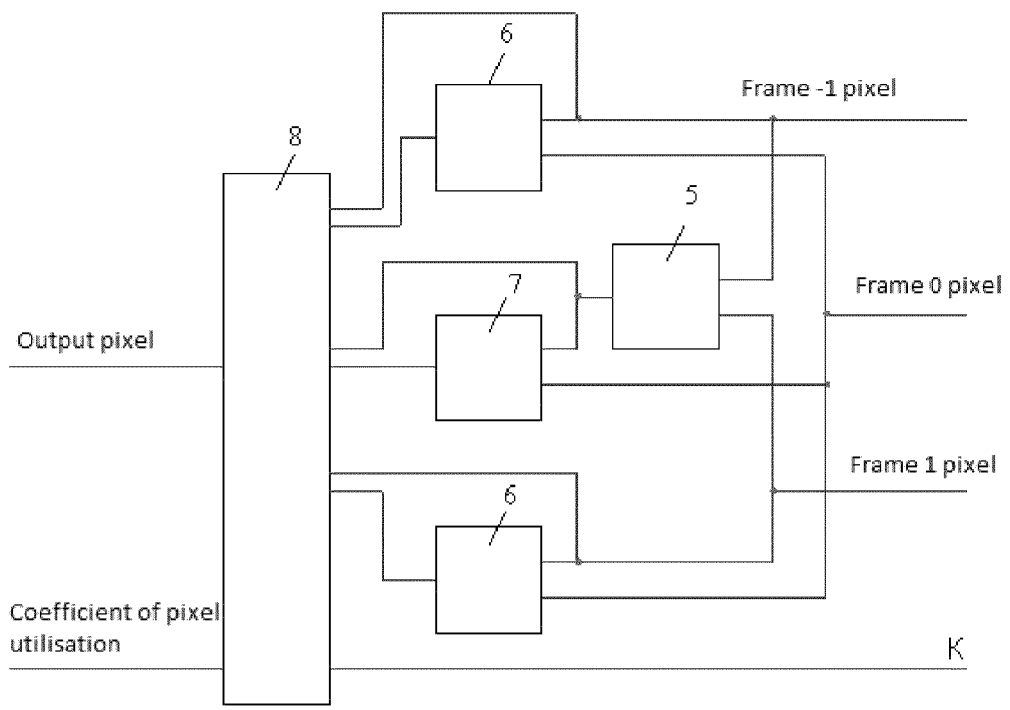
FIG. 2 shows a block diagram of the group processing module.

FIG. 2 shows a block diagram of the group processing module 1 where: 5—is an arithmetical average computing unit, 6—is an absolute value of the difference computing unit, 7—is a half absolute value of the difference computing unit, 8—is absolute value of the difference minimal selection unit.

Four values are transferred to the group processing module: pixel values of the frame under processing, pixel values time-symmetrically juxtaposed with respect to a frame and coefficient by which pixel values of this group are multiplied. Pixel values of symmetrical frames are transferred to the arithmetical average computing unit 5. Obtained average value and pixel value of the frame under processing are transferred to the half absolute value of the difference computing unit 7. To absolute value of the difference computing unit 6 are transferred pixel values of symmetrical frames. Three obtained absolute values of the differences are transferred to the absolute value of the difference minimal selection unit 8. Depending on what absolute value of the difference turns out minimal to the output of unit 8 is transferred either pixel value of one of the symmetrical frames or average value of both these frames. In addition, if an average value is selected in the unit 8, the coefficient K is multiplied by 2.

In specific embodiment versions of the claimed method:

weight coefficient values can be selected in correlation with frame pair remoteness from the frame under processing;

weight coefficient values can be calculated considering one parameter equal to a width of a bell-shaped curve as a function of coefficient via frame number, that width defines the extent of noise reduction;

amount of frames employed for processing as a parameter of noise reduction;

amount of frames employed for processing is selected to be double width of a bell-shaped curve;

absolute value of the difference is calculated for a processed pixel and two adjacent pixels in a row and as a resulted value is selected one of three values employing a median filter.

A distinctive characteristic of the claimed method is that for noise reduction time-symmetrically juxtaposed with respect to the frame under processing forth and back in time frames are used. It is understood that for calculation of averaged value of any pixel either appropriate pixel values of one frame or other one, or an averaged pixel value of both these frames is used. To select one out of three values the absolute values of the differences of these values with the pixel value of the frame under processing are calculated, then the minimal absolute value of the difference is defined and appropriate pixel value is used for averaging. While averaging selected pixel values are multiplied by coefficients that depend on remoteness extent from the frame under processing. Amount of frames employed in the method and functional coefficient dependence on remoteness extent from the frame under processing define parameters for noise reduction.

To select one out of three values the absolute values of the differences of these values with the pixel value of the frame under processing are calculated then the minimal absolute value of the difference is defined and appropriate pixel value is used for averaging. While averaging selected pixel values are multiplied by coefficients that depend on remoteness extent from the frame under processing. Amount of frames employed in the method and functional coefficient dependence on remoteness extent from the frame under processing define parameters for noise reduction.

The method is carried out as follows:

A sequence comprising N frames is obtained, where N is the frame number. Then the odd number of frames are processed simultaneously, that is N+1 frames being time—symmetrically juxtaposed against the frame under processing with the numbers from −N to N inclusive, where 0 is the number of the current frame, in which the noise is being reduced, −1 is the number of the previous frame, 1 is the number of the next frame—N is the number of the oldest frame and N is the number of the newest frame.

For each pixel of the frame under processing a new value is calculated in the following way.

With the aim of clarification let us introduce the following notations:

$P_{-N}(x,y)$ is a pixel value of the oldest frame, $P_{-N+1}(x,y)$ is a pixel value of the next frame, $P0(x,y)$ is a pixel value of the frame under processing, $PN(x,y)$ is a pixel value of the newest frame.

Here:

y is an image row number, x is a pixel position in the image row.

The following algorithm is used to calculate an output frame.

Coefficients for frame pairs KM are calculated, where M is a number of a frame pair time—symmetrically juxtaposed with respect to the frame under processing, correspondingly M varies from 1 to N, the sum of products of pixel values and coefficients $\Sigma PK$ is equated to 0, the sum of coefficients $\Sigma K$ is equated to 0, the $P0(x,y)$ value of the pixel under processing is multiplied by the coefficient K0 and added to $\Sigma PK$, K0 is added to $\Sigma K$ for all frame pairs time—symmetrically juxtaposed with respect to the frame under processing; in other words for all M values from 1 to N, the following operations are implemented:

absolute values of the differences of pixel values firstly, with the frame numbers 0 and then 0 and M; 0 and an average pixel value for frame numbers—M and M are calculated.

$$D_{-M} = |P0(x,y) - P_{-M}(x,y)|$$

$$DM = |P0(x,y) - PM(x,y)|$$

$$DA = |P0(x,y) - (P_{-M}(x,y) + PM(x,y))/2|/2$$

the minimal values of D-M, DM, DA are determined if a minimal value turned out to be D-M, $\Sigma PK$ is added to $P_{-M}(x,y)*KM$, and to $\Sigma K$ is added KM. If a minimal value turned out to be DM, so to $\Sigma PK$ is added $PM(x,y)*KM$, and to $\Sigma K$ is also added KM. If a minimal value turned out to be DA, so to $\Sigma PK$ is added $(P_{-M}(x,y) + PM(x,y))*KM$, and to $\Sigma K$ is added $2*KM$.

After processing of all M frame pairs the resulted pixel value can be computed in the following way $$P_{out}(x,y) = \Sigma PK/\Sigma K.$$

A required extent of noise reduction determines KM coefficient selection.

There are two special coefficient sets. The first set corresponds to maximal extent of noise reduction with all coefficients being equal to 1. The second set corresponds to the complete absence of noise reduction with all coefficients equal to 0, except for K0 that is equal to 1. For noise reduction of intermediate values the coefficients are calculated such that the coefficients for the frames juxtaposed to the current frame (frame "0") be close to K0 in their value and decrease as the frame number increases. Other variants can be developed in different ways.

In one embodiment the coefficient value via frame number dependence is given by a bell-shaped curve; the width of the bell-shaped curve will determine the noise reduction extent. The example of such a function:

For $i < R$ $$Ki = (\cos(i \cdot \pi/R) + 1.0)$$

For $i > R$ $$Ki = 0.$$

Here R is a parameter determining noise reduction extent. At R>>N all coefficients are equal and noise reduction extent is minimal. At R<1 all values except the average are equal to "0", a noise reducer will be practically OFF. R=2 means that the middle frame will be ON with the coefficient of 0.5, and two adjacent ones—with coefficients of 0.25, that is the width of the bell will be 2.

The method assumes that there is a delay of N in image output. Therefore, when selecting the number of frames a compromise between desired maximal noise reduction extent and minimal delay in image output shall be taken into consideration.

In the claimed method such artifacts as brightness jump tailing are decreased significantly due to their being positioned symmetrically with respect to the middle frame, that is the artifact is allocated on two sides of the middle frame and its visibility diminishes sharply. In addition, when brightness is changed gradually, due to using frames positioned symmetrically with regard to the middle frame, noise reduction extent increases significantly even when the image changes. Besides, if the image stops changing with respect to the middle frame, or does not change up to the current frame the noise reduction extent keeps remaining high. Moreover, in the claimed embodiment setting time is limited by a selected number of cells.

The claimed method can be realized with the use of known hardware. An example of an embodiment for carrying out the method is shown in FIGS. 1 and 2.

What is claimed is:

1. A method of reducing noise in a video produced using a TV camera, the method comprising generating in a video channel a video flow with at least one video frame group, the at least one video frame group comprising an odd number of 2N+1 video frames having time interdependence, wherein N is ≥1, and wherein the video frame to be processed for reducing noise to produce an output video frame is a middle video frame in the at least one video frame group, and wherein remaining video frames in the at least one video frame group are N pairs of video frames juxtaposed time-symmetrically with respect to the middle video frame;

determining a pixel value of a corresponding pixel positioned in each of the 2N+1 video frames;

calculating for each pair of video frames an average pixel value for corresponding pixels positioned in the video frames of the pair;

calculating for each pair of video frames an absolute value of a difference between the calculated average pixel value and the determined pixel value of a corresponding pixel in the middle frame, calculating for each video frame of each pair an absolute value of a difference between the determined pixel value of a corresponding pixel positioned in a pair of video frames and the determined pixel value of a corresponding pixel positioned in the middle video frame;

determining a minimal of all said absolute values; and selecting a pixel value for a corresponding pixel in the output frame as a weighted pixel value corresponding to the determined minimal absolute value.

2. The method of claim 1, wherein weight coefficients selected for the weighted pixel value depend on the distance between the frame and remaining frames in a frame pair.

3. The method of claim 1, wherein the weight coefficients are determined using a parameter equal to a width of a bell-shaped function determining a weight coefficient for a frame number, and wherein the width determines extent of the noise reduction.

4. The method of claim 1, wherein the number of frames in a video channel used for processing is a parameter for the noise reduction.

5. The method of claim 1, wherein the number of frames in a video channel used for processing is twice a width of a bell-shaped curve.

6. The method of claim 1, further comprising calculating an absolute value of a difference for a processed pixel and two pixels adjacent to the processed pixel in a row and selecting a resulting value from the three values using a median filter.

* * * * *